(12) United States Patent
Sotoma

(10) Patent No.: US 11,189,903 B2
(45) Date of Patent: Nov. 30, 2021

(54) ANTENNA APPARATUS AND COMMUNICATIONS TERMINAL APPARATUS

(71) Applicant: SHARP KABUSHIKI KAISHA, Sakai (JP)

(72) Inventor: Naoki Sotoma, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 22 days.

(21) Appl. No.: 16/821,707

(22) Filed: Mar. 17, 2020

(65) Prior Publication Data

US 2020/0313272 A1 Oct. 1, 2020

(30) Foreign Application Priority Data

Mar. 26, 2019 (JP) .............................. JP2019-058999

(51) Int. Cl.
*H01Q 1/02* (2006.01)
*H04B 1/036* (2006.01)

(52) U.S. Cl.
CPC ............... *H01Q 1/02* (2013.01); *H04B 1/036* (2013.01)

(58) Field of Classification Search
CPC .................................. H01Q 1/02; H04B 1/036
See application file for complete search history.

(56) References Cited

U.S. PATENT DOCUMENTS

| 2018/0206324 A1* | 7/2018 | Hayakawa | .......... H01L 23/3677 |
| 2018/0219277 A1 | 8/2018 | Hirata et al. | |
| 2020/0395650 A1* | 12/2020 | Onaka | ..................... H01L 23/29 |

FOREIGN PATENT DOCUMENTS

| JP | 2011-211424 A | 10/2011 |
| JP | 2016-109347 A | 6/2016 |
| JP | 2017-046121 A | 3/2017 |

* cited by examiner

*Primary Examiner* — Nguyen T Vo
(74) *Attorney, Agent, or Firm* — ScienBiziP, P.C.

(57) ABSTRACT

An antenna apparatus includes: an antenna substrate including a heat source provided to at least one face of the antenna substrate; and a heat dissipator configured to dissipate heat produced in the heat source. The heat dissipator contacts with at least a portion of the heat source. An area of a cross section parallel to the antenna substrate of the heat dissipator at a distance less than a predetermined distance in a normal direction of the contact face from the contact face is equal to or less than an area of the contact face, and an area of a cross section parallel to the antenna substrate of the heat dissipator at a distance equal to or more than the predetermined distance from the contact face is larger than the area of the contact face.

6 Claims, 8 Drawing Sheets

ANTENNA APPARATUS AND COMMUNICATIONS TERMINAL APPARATUS

BACKGROUND OF THE INVENTION

Field of the Invention

The present invention relates to an antenna apparatus and a communications terminal apparatus. The present application claims priority to Japanese Patent Application No. 2019-058999, filed Mar. 26, 2019, the contents of which are incorporated herein by reference in its entirety.

Description of the Background Art

Recent years have seen an increase in demand of millimeter-wave antenna modules to be used for wireless communications systems such as a cellular phone. Required accordingly is dissipation of heat produced by integrated circuits (ICs) provided to the millimeter-wave antenna modules.

Japanese Unexamined Patent Application Publication No. 2016-109347 discloses, for example, an array module including: a first module provided to a lower portion of the array module; and a second module provided to another lower portion of the array module. The lower portion acts as a reservoir of an operation liquid for a first heat pipe, and the other lower portion acts as a reservoir of an operation liquid for a second flat heat pipe.

Moreover, Japanese Unexamined Patent Application Publication No. 2011-211424 discloses a millimeter-wave transmission and reception apparatus which dissipates heat of a millimeter-wave communications IC, using a heat sink, and utilizes a part of the heat sink as an antenna. Hence, the apparatus achieves both expansion of a communication area for millimeter waves and dissipation of heat from the millimeter-wave communications IC.

In addition, Japanese Unexamined Patent Application Publication No. 2017-046121 discloses a small antenna apparatus including an, antenna and a heat dissipator.

However, none of the antenna apparatuses disclosed in Japanese Unexamined Patent Application Publication Nos. 2016-109347, 2011-211424, and 2017-046121 are designed to curb deterioration of antenna performance such as a decrease in gain due to unnecessary radiation. An aspect of the present invention intends to provide an antenna apparatus to achieve both facilitation of heat dissipation and curb in deterioration of antenna performance.

SUMMARY

In order to solve the above problem, an antenna apparatus according to an aspect of the present invention includes:

an antenna substrate including a heat source provided to at least one face of the antenna substrate; and a heat dissipator configured to dissipate heat produced in the heat source, wherein the heat dissipator includes a contact face contacting with at least a portion of the heat source, an area of a cross section parallel to the antenna substrate of the heat dissipator at a distance less than a predetermined distance in a normal direction of the contact face from the contact face is equal to or less than an area of the contact face, and an area of a cross section parallel to the antenna substrate of the heat dissipator at a distance equal to or more than the predetermined distance from the contact face is larger than the area of the contact face.

An aspect of the present invention can provide an antenna apparatus to achieve both facilitation of heat dissipation and curb in deterioration of antenna performance.

DESCRIPTION OF THE PREFERRED EMBODIMENTS

First Embodiment

Figure 1:
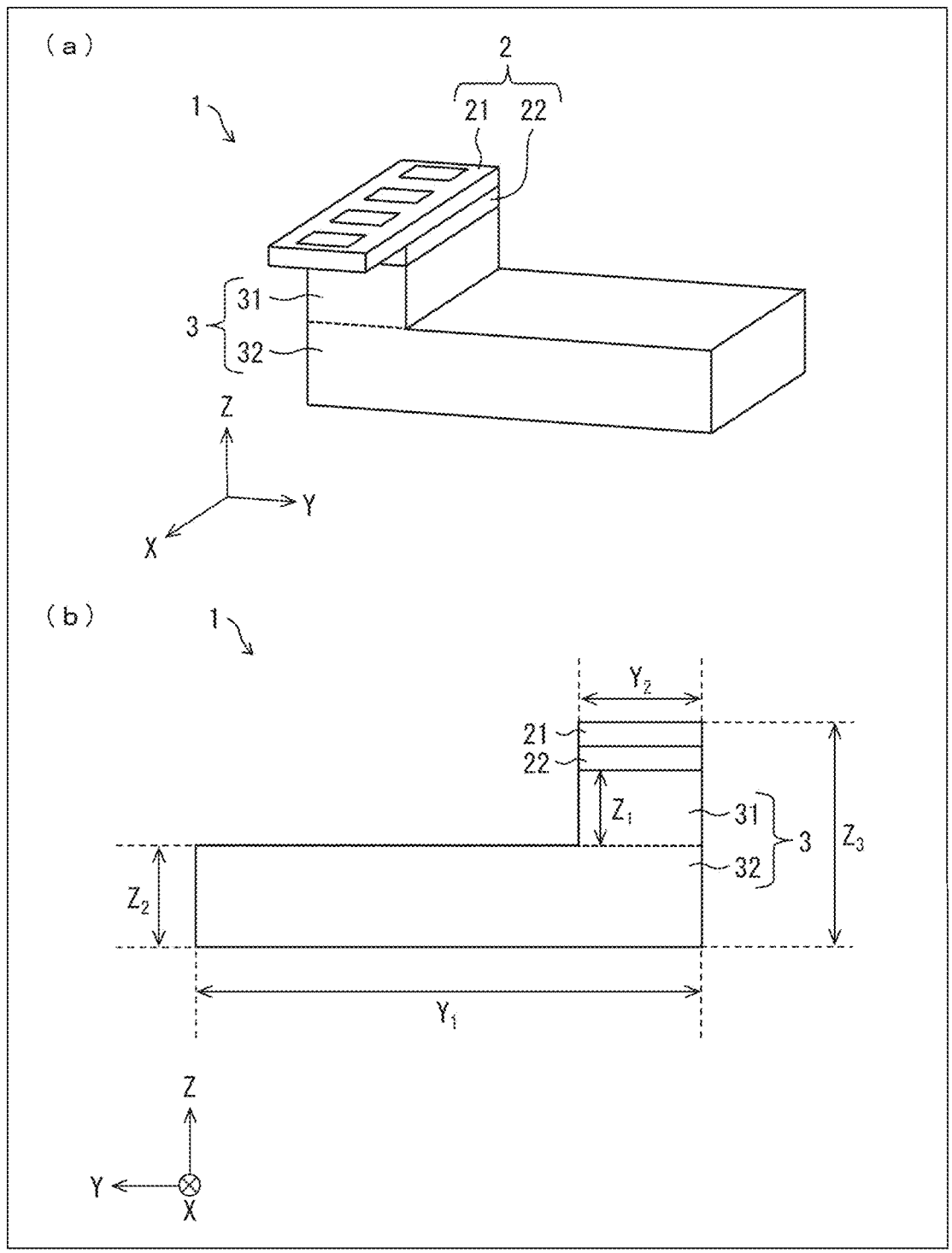
FIG. 1 shows a perspective view (a) illustrating a main configuration of an antenna apparatus according to a first embodiment, and an illustration (b) of the main configuration observed from an X-direction.

With reference to FIG. 1, an antenna apparatus according to a first embodiment of the present invention is described. An illustration (a) in FIG. 1 is a perspective view illustrating a main configuration of an antenna apparatus 1 according to the first embodiment. An illustration (b) in FIG. 1 is a view of the antenna apparatus 1 according to the first embodiment observed from an X-direction.

As illustrated in FIG. 1, a vertical (gravity) direction is referred to as a Z-direction, and respective horizontal directions are referred to as the X-direction and a Y-direction. The X-, Y-, and Z-directions orthogonally intersect to one another.

Antenna Apparatus 1

The antenna apparatus 1 includes an antenna substrate 2 and a heat dissipator 3. The antenna substrate 2 is provided on an upper face of the heat dissipator 3. An example of the antenna apparatus 1 can include, but not limited to, an antenna apparatus provided to such communications terminal apparatuses as a cellular phone terminal, a handheld terminal, a smartphone, a tablet terminal, and a mobile PC terminal.

Antenna Substrate 2

The antenna substrate 2 includes an antenna unit 21 and a heat source 22. The antenna unit 21 includes a plurality of antennae (radiation elements). The radiation elements are not particularly limited in terms of, for example, types and shapes, and known radiation elements can be appropriately used. Moreover, the antenna unit 21 may also include a power supplier supplying power to the radiation elements. The heat source 22 is provided to at least one face of the antenna substrate 2. In FIG. 1, the heat source 22 is provided between a lower face of the antenna unit 21 and the upper face of the heat dissipator 3. The antenna unit 21 and the heat source 22 in FIG. 1 are both shaped into a cuboid. An example of the heat source 22 includes an IC.

Heat Dissipator 3

The heat dissipator 3 dissipates heat produced in the heat source 22. In FIG. 1, the entire lower face of the heat source 22 makes contact with the upper face of the heat dissipator 3. Alternatively, the heat source 22 may partially make contact with the heat dissipator 3. An example of the heat dissipator 3 includes a metal member made of metal. The heat dissipator 3 may have the surfaces either planarized or left unplanarized.

Moreover, an area of cross section parallel to the antenna substrate 2 of the heat dissipator 3 at a distance less than a predetermined distance in a normal direction of a contact face between the antenna substrate 2 (the heat source 22) and the heat dissipator 3 from the contact face is equal to or less than an area of the contact face.

In this Specification, the direction of the normal from the contact face is a downward direction in the Z-axis in the illustration (a) in FIG. 1. Furthermore, the cross-sectional area in parallel with the antenna substrate 2 is an area of a heat dissipater component 31 or a heat dissipater component 32 when observed from the Z-direction in the illustration (a) in FIG. 1. The dissipator components 31 and 32 will be described later.

As illustrated in FIG. 1, the heat dissipator 3 integrally includes the heat dissipator component 31 and the heat dissipator component 32. The heat dissipator 3 of the antenna apparatus 1 in FIG. 1 is of a two-stage structure including the heat dissipater component 31 in an upper stage and the heat dissipator component 32 in a lower stage. Alternatively, the heat dissipator 3 may be of a multi-stage structure including three or more stages.

An area of a cross section of the heat dissipator component 31 in FIG. 1, in parallel with the antenna substrate 2, is as large as the area of the contact face with the antenna substrate 2 (the heat source 22). Moreover, as shown in the illustration (b) in FIG. 1, the heat dissipator component 31 has a length $Z_1$ in the direction of the normal from the contact face with the antenna substrate 2. The length $Z_1$ is the predetermined distance from the contact face, between the antenna substrate 2 and the heat dissipator 3, in the direction of the normal from the contact face. As described in Examples later, the length $Z_1$ preferably ranges from ⅙ wavelength to ⅓ wavelength in view of, for example, reducing resonance in frequency and producing a thinner antenna apparatus. More preferably, the length $Z_1$ is approximately ¼ wavelength.

Moreover, an area of a cross section parallel to the antenna substrate 2 of the heat dissipator 3 at a distance equal to or more than the predetermined distance in the normal direction of the contact face from the contact face to the antenna substrate 2 (the heat source 22) is larger than the area of the contact face.

An area of a cross section of the heat dissipater component 32 in FIG. 1 is in parallel with the antenna substrate 2. The cross-sectional area is larger than the area of the contact face between the antenna substrate 2 and the heat dissipater component 31.

The heat dissipator 3 can dissipate the heat produced in the heat source 22. Furthermore, the heat dissipator 3 is formed in stages (the heat dissipater component 31 in the upper stage and the heat dissipator component 32 in the lower stage), and the cross-sectional area of the heat dissipator component 31 is a predetermined area. Such features make it possible to curb deterioration of antenna performance such as a decrease in gain due to unnecessary radiation. In particular, when the heat dissipator 3 is larger than the antenna substrate 2, the above features make it possible to reduce a decrease in gain due to unnecessary radiation caused by generation of a current running from a face of a grand (GND) of the antenna substrate 2.

In addition, a wireless communications terminal provided with the antenna apparatus 1 facilitates heat dissipation and curbs deterioration of antenna performance such as a decrease in gain due to unnecessary radiation.

Second Embodiment

Figure 2:
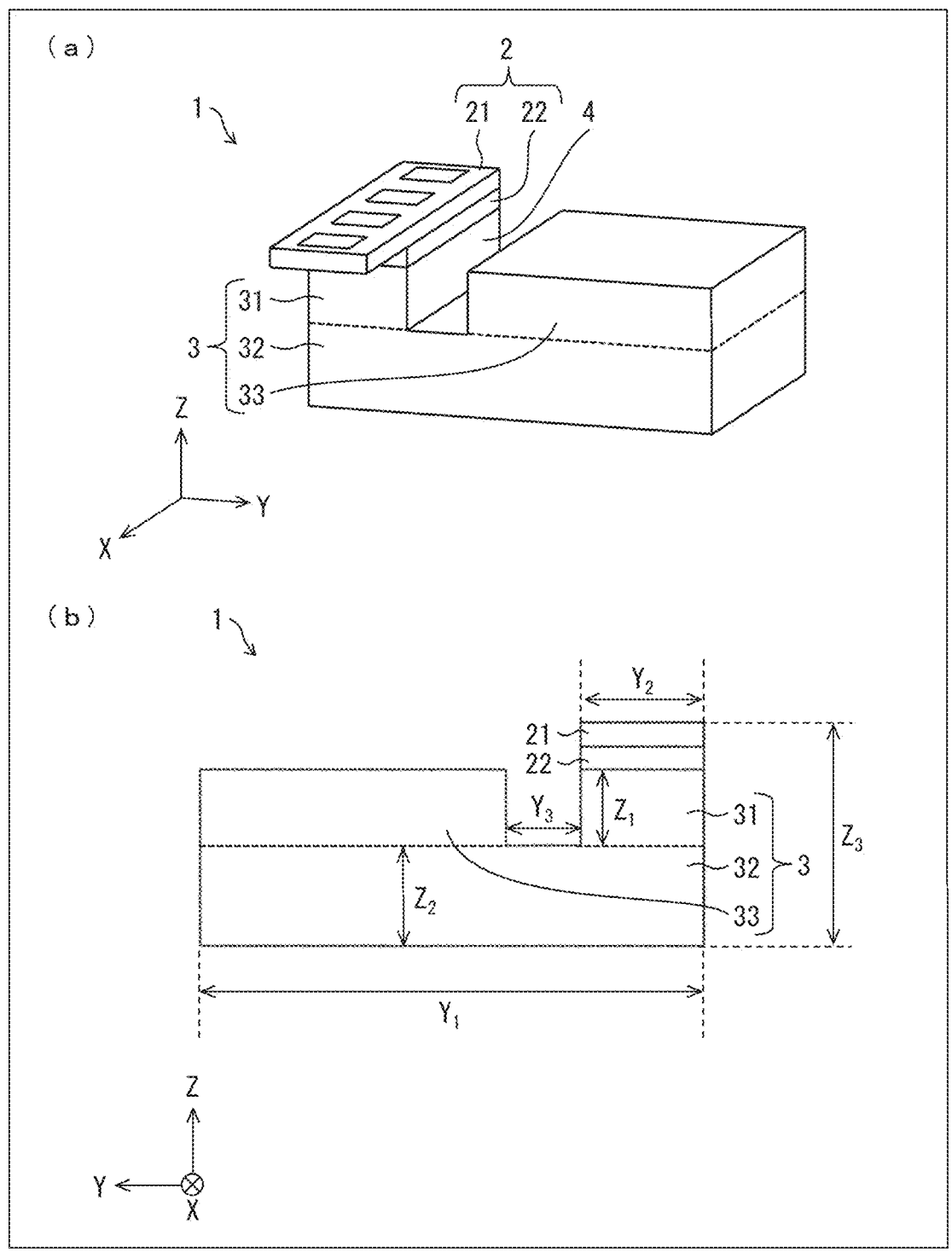
FIG. 2 shows a perspective view (a) illustrating a main configuration of the antenna apparatus according to a second embodiment, and an illustration (b) of the main configuration observed from the X-direction.

Described next is the antenna apparatus 1 according to a second embodiment of the present invention with reference to FIG. 2. Note that, for the sake of convenience, constituent features functionally identical with those in the above embodiment have the same reference signs. Such constituent features will not be repeatedly elaborated upon. An illustration (a) in FIG. 2 is a perspective view showing a main configuration of the antenna apparatus 1 of the second embodiment. An illustration (b) in FIG. 2 shows the antenna 1 of the second embodiment observed from the X-direction.

The second embodiment is different from the first embodiment in that the heat dissipator component 32 has an upper face provided with a heat dissipator component 33 separately from the heat dissipator component 31 making contact with the antenna substrate 2. With the heat dissipator component 33 provided, the upper face of the heat dissipator 3 is provided with a slit 4 along an edge of the contact face between the antenna substrate 2 and the heat dissipator 3. That is, as shown in the illustration (a) in FIG. 2, the slit 4 is provided in the X-direction along a lower face of the heat dissipator component 31. The slit 4 provided increases the surface area of the dissipator 3, making it possible to facilitate heat dissipation and curb deterioration of antenna performance such as a decrease in gain due to unnecessary radiation.

The slit 4 has a width ($Y_3$ the illustration (b) of FIG. 2) preferably ranging from ¼ wavelength to ⅔ wavelength in view of, for example, curbing deterioration of antenna performance. As described in Examples later, the slit 4 has a height ($Z_1$ in the illustration (b) in FIG. 2) preferably ranging from ⅙ wavelength to ⅓ wavelength in view of, for example, reducing resonance in frequency and producing a thinner antenna apparatus. More preferably, the height $Z_1$ is approximately ¼ wavelength.

Third Embodiment

Figure 3:
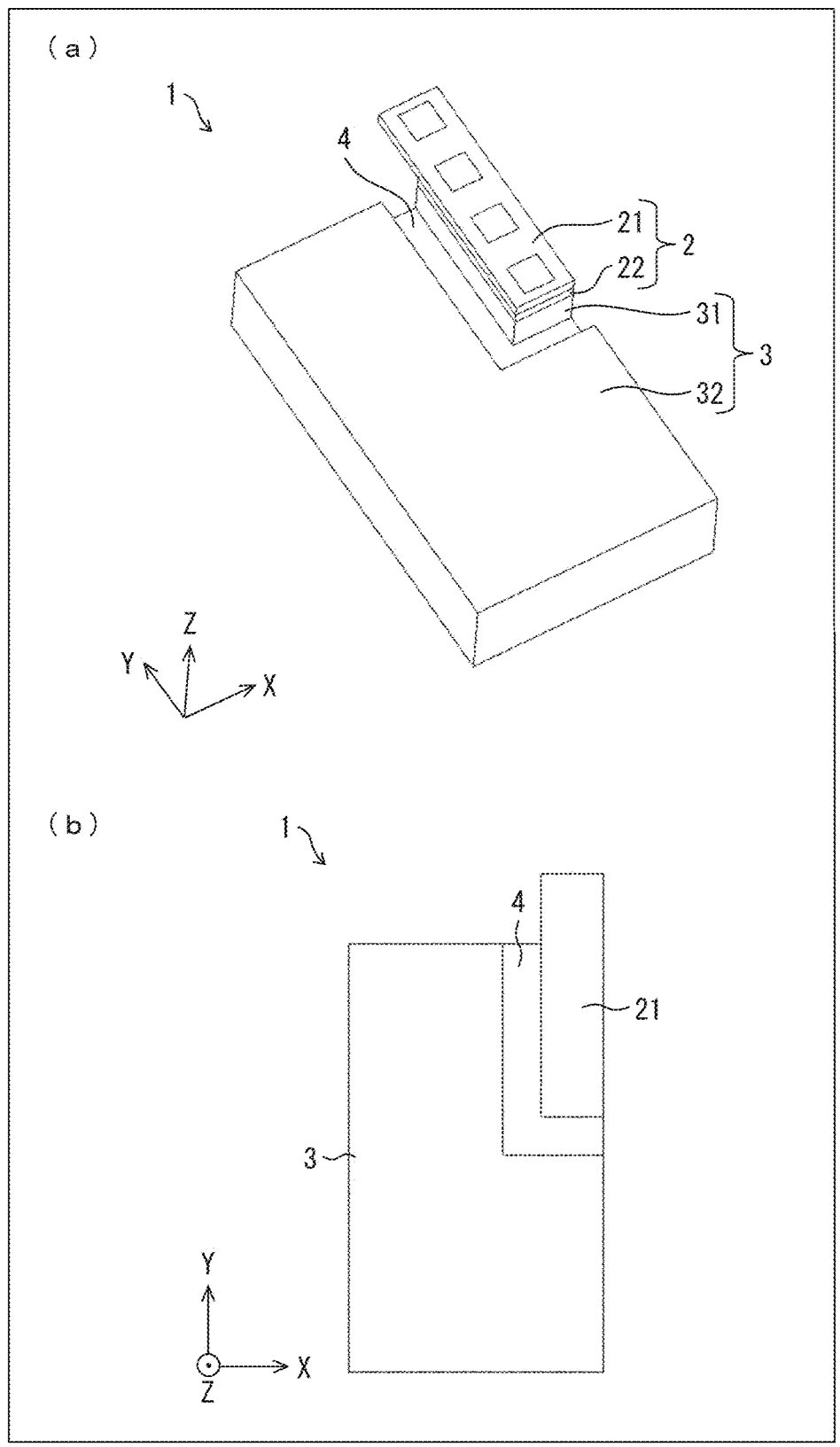
FIG. 3 shows a perspective view (a) and a top view (b) illustrating a main configuration of the antenna apparatus according to a third embodiment.

Described next is the antenna apparatus 1 according to a third embodiment of the present invention with reference to FIG. 3. Note that, for the sake of convenience, constituent features functionally identical with those in the above embodiment have the same reference signs. Such constituent features will not be repeatedly elaborated upon. FIG. 3 shows a perspective view an illustration (a) and a top view in an illustration (b) of a main configuration of the antenna apparatus 1 according to the third embodiment.

The third embodiment is different from the second embodiment in that the slit 4 in the illustration (a) of FIG. 3 is provided also in the Y-direction, in addition to the X-direction, along the lower face of the heat dissipator component 31. That is, the slit 4 is provided along two of the four sides of the rectangular contact face between the antenna substrate 2 and the heat dissipator 3. Such a feature makes it possible to further reduce an amount of a current running through the heat dissipator 3 and curb deterioration of antenna performance such as a decrease in gain due to unnecessary radiation. In this Specification, the rectangle includes an oblong figure, a square, and a parallelogram.

Fourth Embodiment

Figure 4:
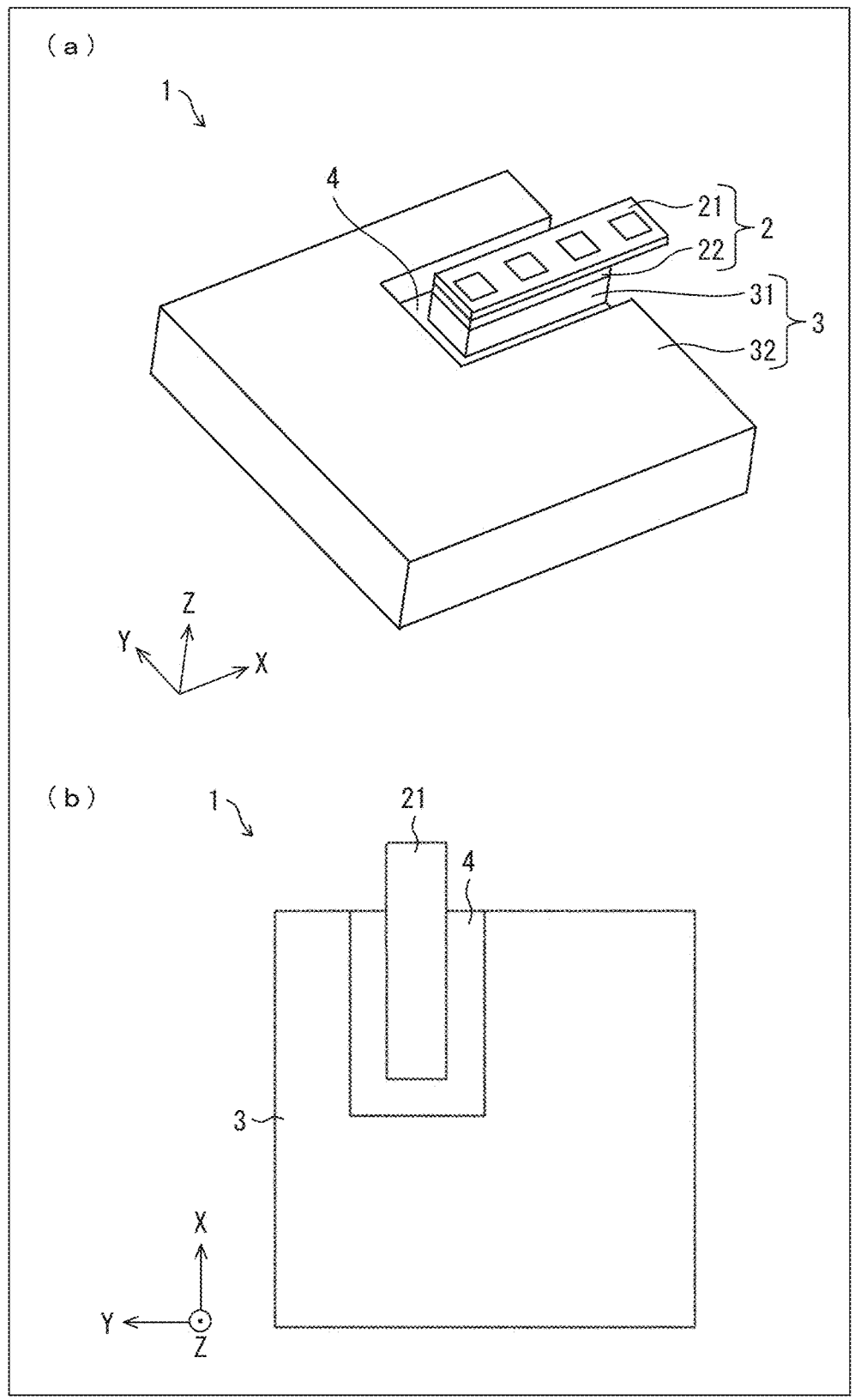
FIG. 4 shows a perspective view (a) and a top view (b) illustrating the main configuration of the antenna apparatus according to the third embodiment.

Described next is the antenna apparatus 1 according to a fourth embodiment of the present invention with reference to FIG. 4. Note that, for the sake of convenience, constituent features functionally identical with those in the above embodiment have the same reference signs. Such constituent features will not be repeatedly elaborated upon. In FIG. 4, an illustration (a) shows a perspective view of a main configuration of the antenna apparatus 1 according to the fourth embodiment, and an illustration (b) shows a top view of the main configuration.

The fourth embodiment is different from the third embodiment in that, as shown in the illustration (b) of FIG. 4, the slit 4 is provided along three of the four sides of the rectangular contact face between the antenna substrate 2 and the heat dissipator 3. Such a feature makes it possible to further reduce an amount of a current running through the heat dissipator 3 and curb deterioration of antenna performance such as a decrease in gain due to unnecessary radiation.

SUMMARY

An antenna apparatus according to an aspect of the present invention includes: an antenna substrate including a heat source provided to at least one face of the antenna substrate; and a heat dissipator configured to dissipate heat produced in the heat source. The heat dissipator includes a contact face contacting with at least a portion of the heat source. An area of a cross section parallel to the antenna substrate of the heat dissipator at a distance less than a predetermined distance in a normal direction of the contact face from the contact face is equal to or less than an area of the contact face, and an area of a cross section parallel to the antenna substrate of the heat dissipator at a distance equal to or more than the predetermined distance from the contact face is larger than the area of the contact face.

The above features make it possible to facilitate heat dissipation and curb deterioration of antenna performance such as a decrease in gain due to unnecessary radiation.

In the antenna apparatus of a second aspect according to the first aspect, the heat dissipator may include an upper face provided with a slit along an edge of the contact face.

In the above feature, the slit increases the surface area of the dissipator, making it possible to facilitate heat dissipation and curb deterioration of antenna performance such as a decrease in gain due to unnecessary radiation.

In the antenna apparatus of a third aspect according to the first aspect, the contact face is rectangular, and the heat dissipator includes an upper face provided with a slit along at least two of four sides of the contact face.

Such a feature makes it possible to further reduce an amount of a current running through the heat dissipator and curb deterioration of antenna performance such as a decrease in gain due to unnecessary radiation.

A communications terminal apparatus of a fourth aspect of the present invention includes the antenna apparatus of any one of the first to third aspects.

The above feature makes it possible to facilitate heat dissipation of the communications terminal apparatus, contributing to curb in deterioration of antenna performance such as a decrease in gain due to unnecessary radiation.

The present invention shall not be limited to the embodiments described above, and can be modified in various manners within the scope of claims. The technical aspects disclosed in different embodiments are to be appropriately combined together to implement an embodiment. Such an embodiment shall be included within the technical scope of the present invention. Moreover, the technical aspects disclosed in each embodiment are combined to achieve a new technical feature.

EXAMPLES

Production Example 1: Producing Antenna Apparatus

A heat dissipation block (the heat dissipator 3) was prepared. The heat dissipation block had a shape shown in the illustration (a) in FIG. 1. Next, as shown in the illustration (a) in FIG. 1, the antenna substrate 2 including the antenna unit 21 and the heat source 22 was provided on the upper face of the heat dissipation block (the heat dissipator 3) having a height of $Z_1+Z_2$. Hence, the antenna apparatus 1 was produced. The illustration (b) in FIG. 1 is a drawing of the antenna apparatus 1 observed from the X-direction. The antenna apparatus 1 had a length $Y_1$ of 20 mm, a length $Y_2$ of 5 mm, a length $Z_1$ of 3 mm, a length $Z_2$ of 13.5 mm, and a length $Z_3$ of 20 mm.

Production Example 2: Producing Antenna Apparatus

A heat dissipation block (the heat dissipator 3) was prepared. The heat dissipation block had a shape shown in the illustration (a) in FIG. 2. Next, as shown in the illustration (a) in FIG. 2, the antenna substrate 2 including the antenna unit 21 and the heat source 22 was provided on the upper face of the heat dissipation block (the heat dissipator 3) having the height of $Z_1+Z_2$. Hence, the antenna apparatus 1 was produced. The illustration (b) in FIG. 2 is a drawing of the antenna apparatus 1 observed from the X-direction. The antenna apparatus 1 had the length $Y_1$ of 20 mm, the length $Y_2$ of 5 mm, a length $Y_3$ of 3 mm, the length $Z_1$ of 3 mm, the length $Z_2$ of 10.5 mm, and the length $Z_3$ of 20 mm.

Production Example 3: Producing Antenna Apparatus

Figure 5:
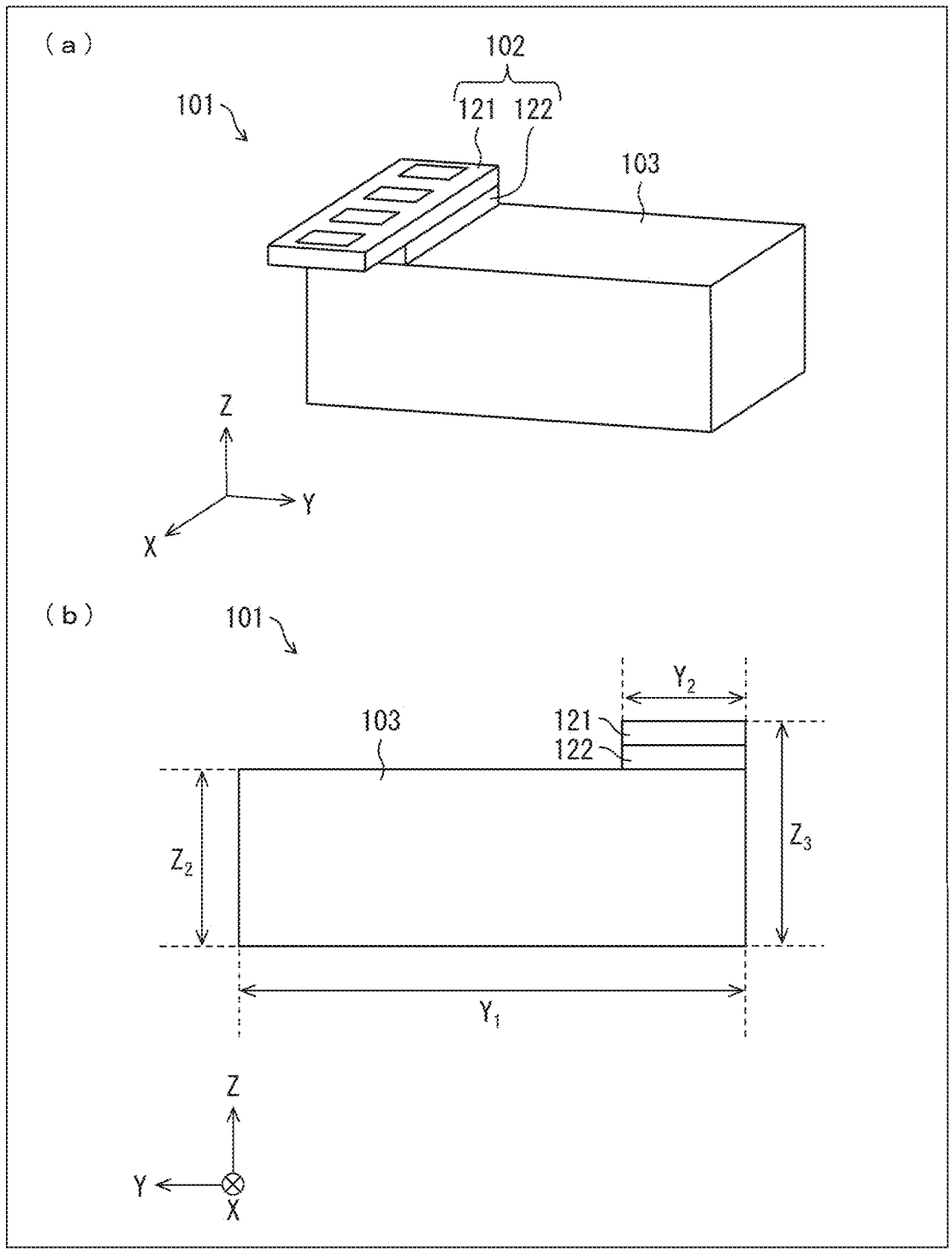
FIG. 5 shows a perspective view (a) illustrating a main configuration of an antenna apparatus according to Production Example 3, and an illustration (b) of the main configuration observed from the X-direction.

A heat dissipation block (a heat dissipator 103) was prepared. The heat dissipation block had a shape shown in the illustration (a) in FIG. 5. Next, as shown in the illustration (a) in FIG. 5, an antenna substrate 102 including an antenna unit 121 and a heat source 122 was provided on an upper face of the heat dissipation block (the heat dissipator 103) having the height of Z2. Hence, the antenna apparatus 102 was produced. The illustration (b) in FIG. 5 is a drawing of the antenna apparatus 101 observed from the X-direction. The antenna apparatus 101 had the length $Y_1$ of 20 mm, the length $Y_2$ of 5 mm, the length $Z_2$ of 13.5 mm, and the length $Z_3$ of 20 mm.

Evaluation Example 1: Measuring Gain

Figure 6:
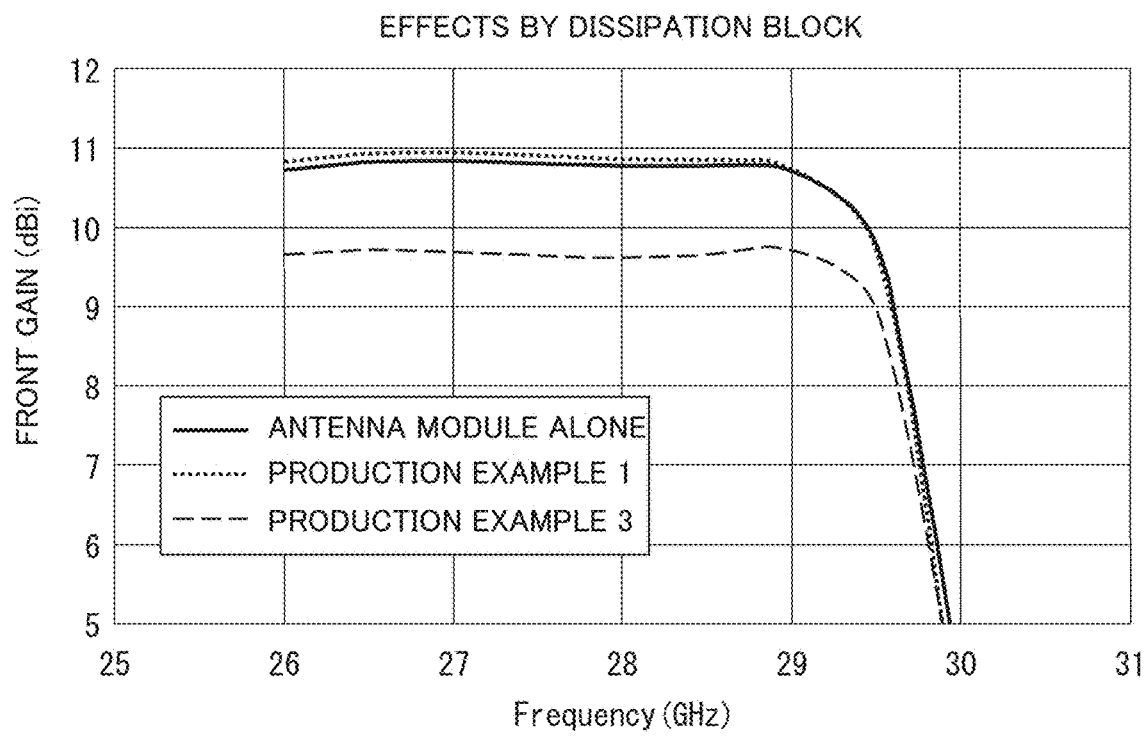
FIG. 6 shows a graph illustrating a result of measuring gains of the antenna apparatuses of Production Examples 1 and 3.

Gains were measured of the antenna apparatuses in Production Examples 1 and 3, and of an antenna substrate without a heat dissipation block (a heat dissipator). FIG. 6 shows the results.

FRONT GAIN of the vertical axis in FIG. 6 represents a gain in an X-Y planar direction in FIGS. 1 and 5.

As illustrated in FIG. 6, the antenna apparatus in Production Example 3 was not able to curb reduction of the gain. Meanwhile, the antenna apparatus in Production Example 1 was able to curb reduction of the gain.

Evaluation Example 2: Measuring Gain

Figure 7:
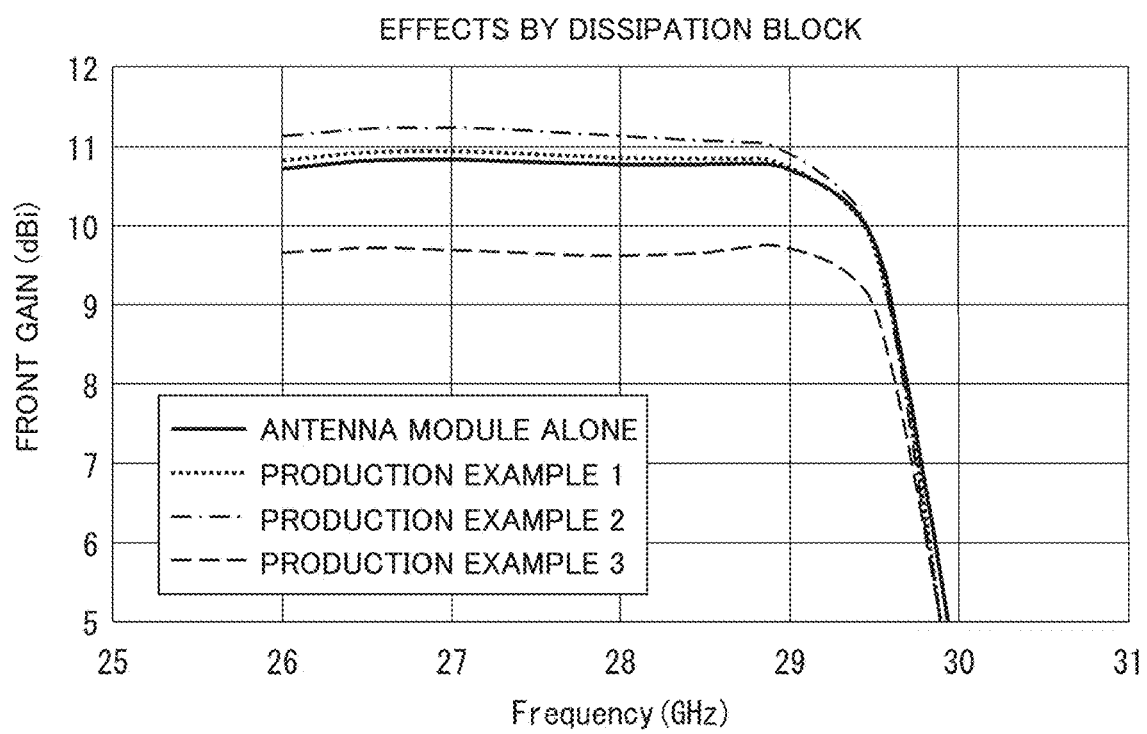
FIG. 7 shows a graph illustrating a result of measuring gains of the antenna apparatuses of Production Examples 1 to 3.

In a similar manner to Evaluation Example 1, measured were gains of the antenna apparatuses in Production Examples 1 to 3, and of an antenna substrate without a heat dissipation block (a heat dissipator). FIG. 7 shows the results.

As illustrated in FIG. 7, the antenna apparatus provided with a slit in Production Example 2 was able to further curb reduction of the gain.

Evaluation Example 3: Measuring Current Distribution

Figure 8:
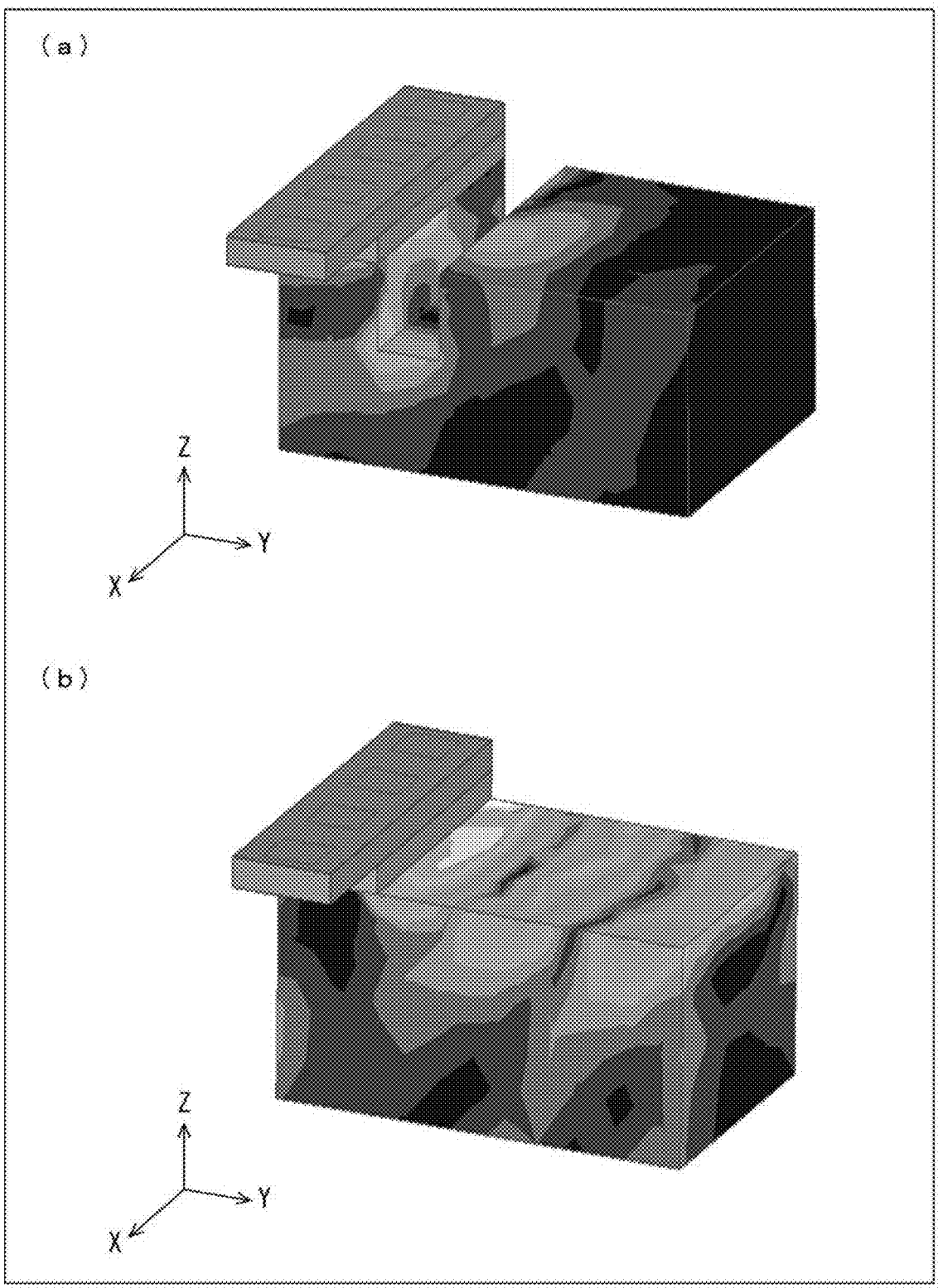
FIG. 8 shows a view (a) illustrating distribution of currents at 28 GHz in the antenna apparatuses of Production Examples 2 and a view (b) illustrating distribution of currents at 28 GHz in the antenna apparatuses of Production Example 3.

Current distributions mere measured when the antenna apparatuses in Production Examples 2 and 3 transmitted and received a radio wave of 28 GHz. FIG. 8 shows the results. An illustration (a) in FIG. 8 shows a current distribution of the antenna apparatus in Production Example 2, and an illustration (b) in FIG. 8 shows a current distribution of the antenna apparatus in Production Example 3. In FIG. 8, a white (bright) portion shows a large amount of current, and a black (dark) portion shows a small amount of current.

As illustrated in FIG. 8, the antenna apparatus in Production Example 3 conducted a large amount of current in particular near the contact face between the antenna substrate and the heat dissipation block (the heat dissipator). Meanwhile, compared with the antenna apparatus in Production Example 3, the antenna apparatus in Production Example 2 conducted less amount of current.

Figure 9:
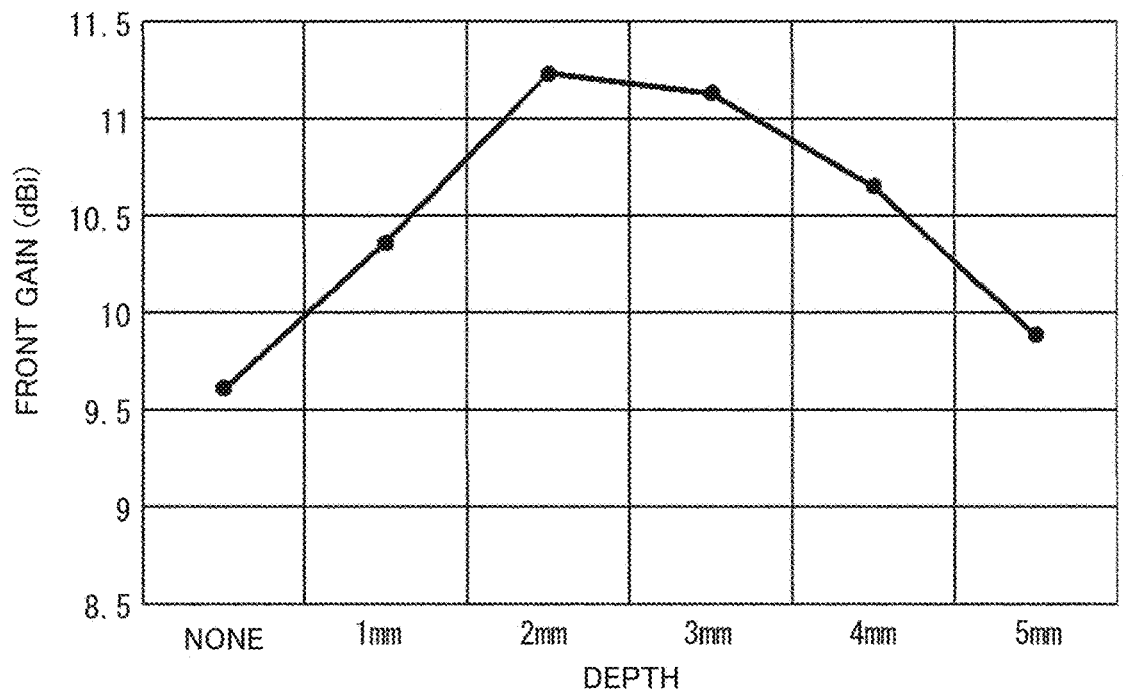
FIG. 9 shows a graph illustrating a result of measuring a gain when a depth of a slit is changed.

Evaluation Example 4: Effects on Curb in Gain Reduction Caused by Change in Depth of Slit Next, effects were studied on the curb in gain reduction observed in changing the depth ($Z_1$ of the illustration (b) in FIG. 2) of the slit 4 of the antenna apparatus 1 in Production Example 2. The gain was measured in a similar manner as Evaluation Example 1, and the evaluation was made with a frequency of 28 GHz. FIG. 9 shows the results.

As shown in FIG. 9, the slit 4 having a depth of approximately 3 mm, which was λ/4 of a radio wave at 28 GHz, was able to curb reduction of the gain.

Figure 10:
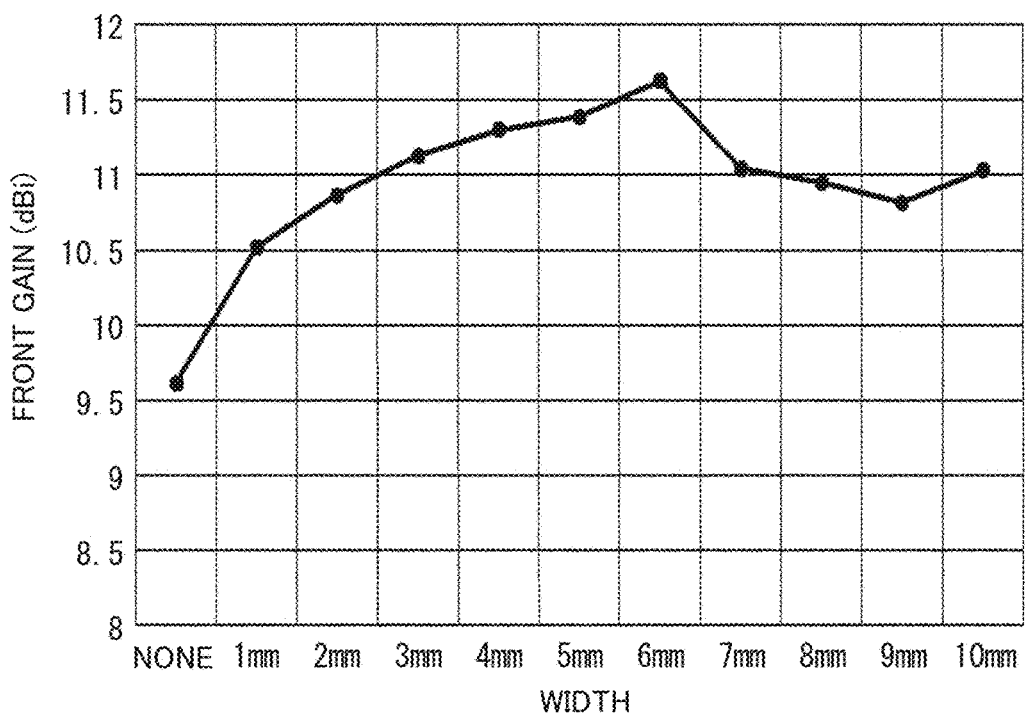
FIG. 10 shows a graph illustrating a result of measuring a gain when a width of the slit is changed.

Evaluation Example 5: Effects on Curb in Gain Reduction Caused by Change in Width of Slit Next, effects were studied on the curb in gain reduction observed in changing the width ($Y_3$ of the illustration (b) in FIG. 2) of the slit 4 of the antenna apparatus 1 in Production Example 2. The gain was measured in a similar manner as Evaluation Example 1, and the evaluation was made with a frequency of 28 GHz. FIG. 10 shows the results.

As shown in FIG. 10, the slit 4 having a width of approximately 6 mm, which was λ/2 of a radio wave at 28 GHz, was especially able to curb reduction of the gain.

SUMMARY

The antenna apparatus in Production Example 1 whose heat dissipation block (the heat dissipator) was formed in stages was able to curb gain reduction caused by unnecessary radiation. Furthermore, the antenna apparatus provided with the slit in Production Example 2 was able to curb gain reduction caused by unnecessary radiation, and facilitate heat dissipation. In Evaluation Examples, the front (the X-Y planer direction) gains were measured. It is also interpreted that deterioration in gain in other directions is also curbed.

What is claimed is:

1. An antenna apparatus comprising:
   an antenna substrate including a heat source provided to at least one face of the antenna substrate: and
   a heat dissipator configured to dissipate heat produced in the heat source, wherein
   the heat dissipator is contacting with at least a portion of the heat source and includes: a first component having a first cross-sectional area parallel to the antenna substrate; and a second component having a second cross-sectional area parallel to the antenna substrate, the heat dissipator having a contact face that is in contact with the antenna substrate,
   the first cross-sectional area is equal to or less than an area of the contact face at a distance from the contact face that is less than a predetermined distance,
   the second cross-sectional area is larger than the area of the contact face at a distance being measured normal to the contact fact, and
   the predetermined distance in the normal direction of the contact face is ⅙ wavelength to ⅓ wavelength.

2. The antenna apparatus according to claim 1, wherein the heat dissipator further includes an upper face provided with a slit along an edge of the contact face.

3. The antenna apparatus according to claim 1, wherein the contact face is rectangular, and
   the heat dissipator further includes an upper face provided with a slit along at least two of four sides of the contact face.

4. A communications terminal apparatus including the antenna apparatus according to claim 1.

5. An antenna apparatus comprising:
   an antenna substrate including a heat source provided to at least one face of the antenna substrate: and a heat dissipator configured to dissipate heat produced in the heat source, wherein the heat dissipator is contact with at least a portion of the heat source and includes: a first component having a first cross-sectional area parallel to the antenna substrate; and a second component having a second cross-sectional area parallel to the antenna substrate, the heat dissipator having a contact face that is in contact with the antenna substrate, the first cross-sectional area is equal to or less than an area of the contact face at a distance from the contact face that is less than a predetermined distance, the second cross-sectional area is larger than the area of the contact face at a distance from the contact face that is equal to or more than the predetermined distance, the distances being measured normal to the contact face, and the predetermined distance in the normal direction of the contact face is ¼ wavelength.

6. An antenna apparatus comprising:

an antenna substrate including a heat source provided to at least one face of the antenna substrate; and a heat dissipator configured to dissipate heat produced in the heat source, wherein the heat dissipator is contact with at least a portion of the heat source and includes: a first component having a first cross-sectional area parallel to the antenna substrate; and a second component having a second cross-sectional area parallel to the antenna substrate, the heat dissipator having a contact face that is in contact with the antenna substrate, the first cross-sectional area is equal to or less than an area of the contact face at a distance from the contact face that is less than a predetermined distance, the second cross-sectional area is larger than the area of the contact face at a distance from the contact face that is equal to or more than the predetermined distance, the distances being measured normal to the contact face, and the predetermined distance in the normal direction of the contact face is 2 mm to 3 mm.

* * * * *